(12) United States Patent
Koukan et al.

(10) Patent No.: US 8,485,386 B2
(45) Date of Patent: Jul. 16, 2013

(54) FUEL TANK

(75) Inventors: Ibrahim Koukan, Cologne (DE); Harald Lorenz, Bad Neuenahr-Ahrweiler (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 159 days.

(21) Appl. No.: 12/965,168

(22) Filed: Dec. 10, 2010

(65) Prior Publication Data

US 2011/0139804 A1    Jun. 16, 2011

(30) Foreign Application Priority Data

Dec. 11, 2009  (DE) .......................... 10 2009 057 860

(51) Int. Cl.
*B65D 88/12* (2006.01)
*B60P 3/00* (2006.01)
*B62D 33/00* (2006.01)
*B60K 15/035* (2006.01)

(52) U.S. Cl.
USPC ......................... 220/562; 220/4.14; 220/746

(58) Field of Classification Search
USPC ............. 220/4.12, 4.14, 86.1, 86.2, 562, 746, 220/749; 137/587–589; 123/518
See application file for complete search history.

(56) References Cited

U.S. PATENT DOCUMENTS

| 4,701,198 | A | * | 10/1987 | Uranishi et al. ................ 96/148 |
| 5,740,842 | A | | 4/1998 | Maier et al. |
| 6,708,724 | B2 | | 3/2004 | Morinaga |
| 7,694,665 | B2 | | 4/2010 | Ehrman |
| 2002/0096228 | A1 | * | 7/2002 | Stoddart et al. ............... 141/286 |
| 2008/0184972 | A1 | * | 8/2008 | Ehrman et al. ................ 123/518 |

FOREIGN PATENT DOCUMENTS

DE   20 2008 001 586   6/2008
WO   2009/018002      2/2009

* cited by examiner

*Primary Examiner* — Harry Grosso
(74) *Attorney, Agent, or Firm* — Grossman Tucker Perreault & Pfleger, PLLC

(57) ABSTRACT

The invention relates to a fuel tank (1) with at least one filler pipe (2) enclosing a refueling duct and with at least one vent line (6), which comprises at least one first and one second line section (6a, 6b), the first line section (6a) extending from a vent connection (7) of the fuel tank (1) to a connection on the filler pipe (2), and the second line section (6b) extending from a connection on the filler pipe (2) to a fuel vapor filter (10), wherein at least one line section (6a, 6b) opens directly into the filler pipe (2) via a connection fitting.

9 Claims, 4 Drawing Sheets

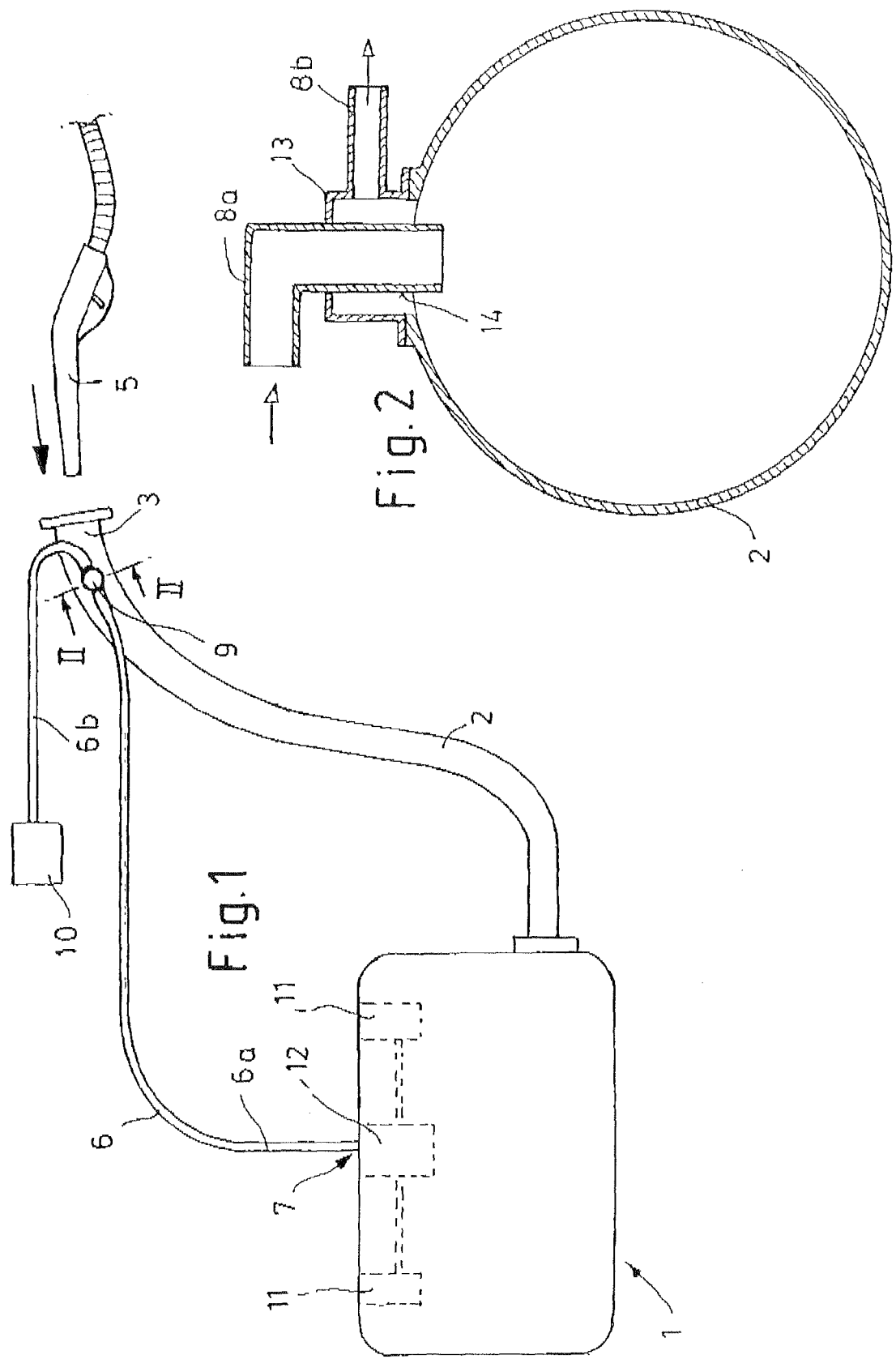

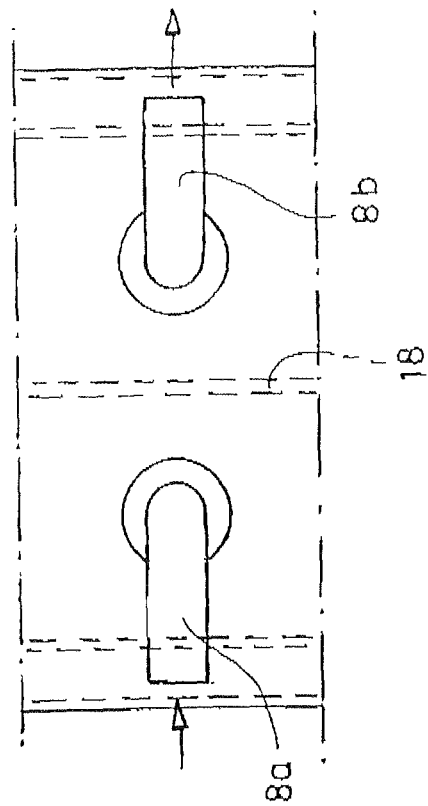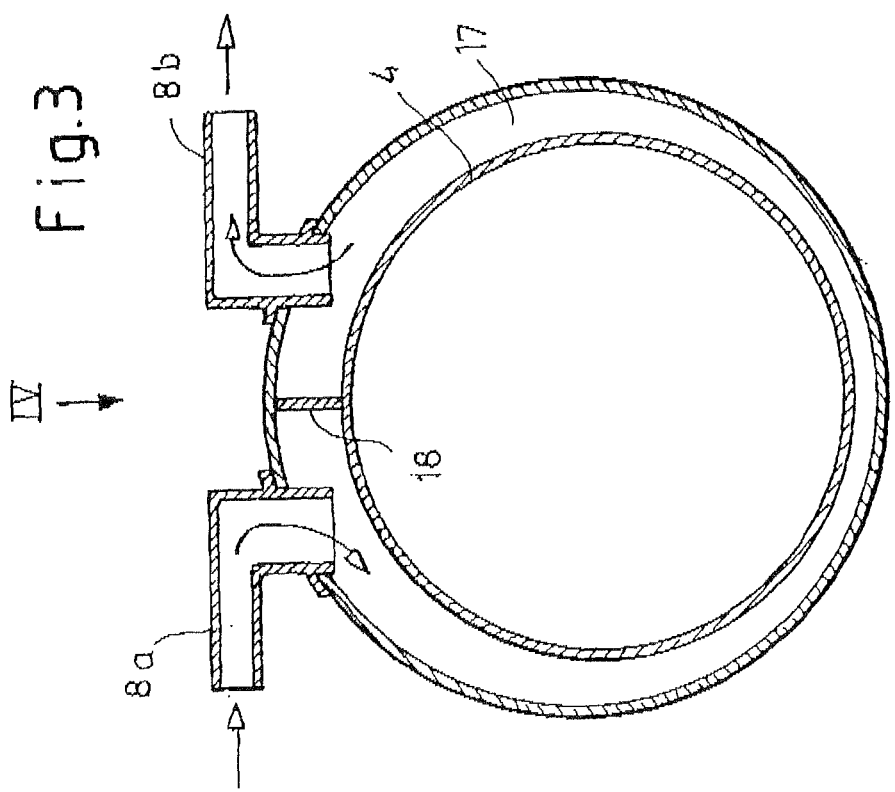

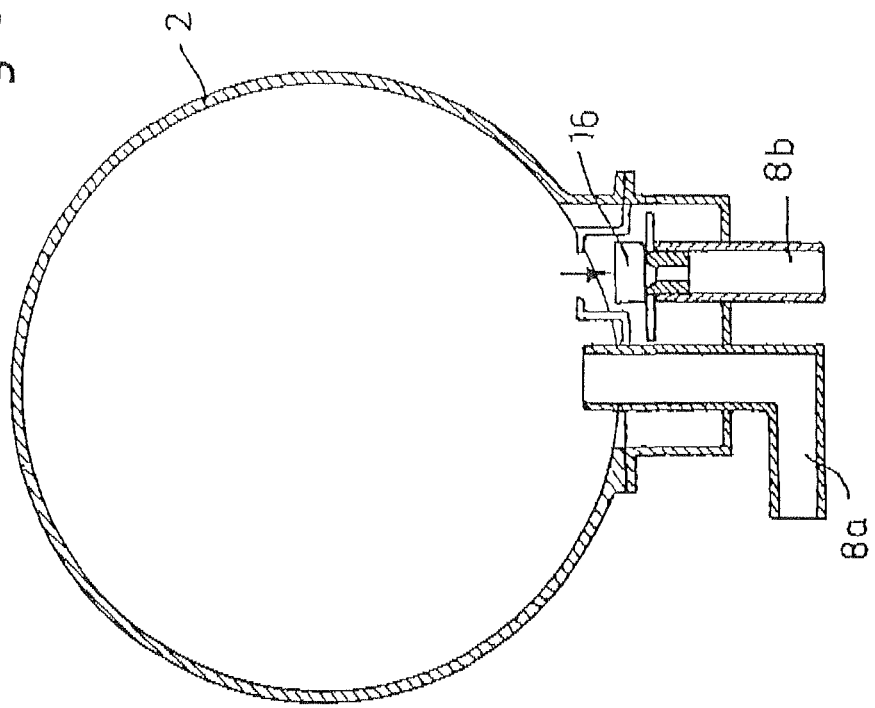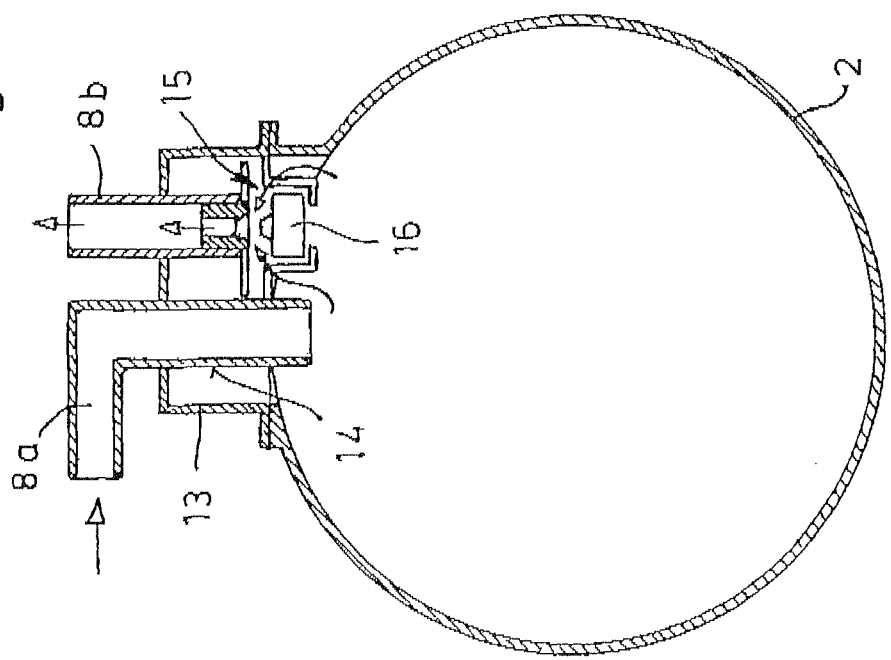

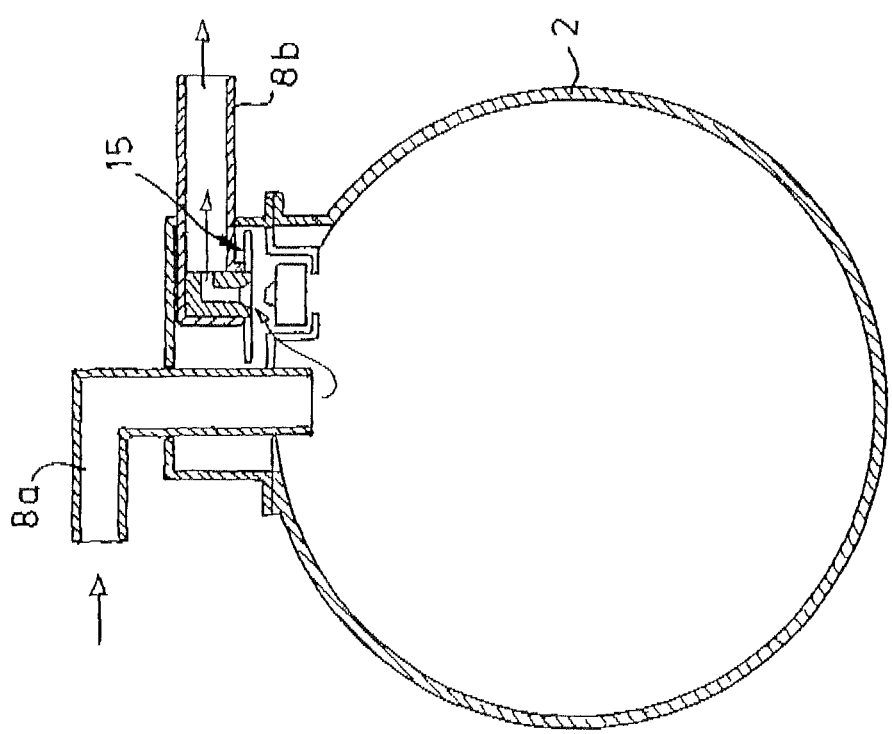

FUEL TANK

The invention relates to a fuel tank with at least one filler pipe enclosing a refueling duct and with at least one vent line, which comprises at least one first and one second line section, the first line section extending from a vent connection of the fuel tank to a connection on the filler pipe, and the second line section extending from a connection on the filler pipe to a fuel vapor filter.

A fuel tank of this kind is known from DE 20 2008 001 586 U1, for example. This to utility model relates to a liquid/vapor separator for a fuel system for a motor vehicle, in which the liquid/vapor separator comprises a housing, with an inlet which is connected to a ventilation system of the fuel tank, and with a vapor outlet, which is connected to a fuel vapor filter. The housing furthermore comprises a condensation space for condensation of fuel droplets, this condensation space being connected to or communicating with the filler neck of the fuel tank.

The gas volume flow which arises when the fuel tank is vented is generally passed via an activated carbon filter as a fuel vapor filter. In order to ensure the ability to function of the fuel vapor filter or activated carbon filter, it is at any event necessary to keep hydrocarbons in the liquid phase or in droplet form out of the fuel gas volume flow. These droplets taken along by the fuel gas volume flow are also referred to as "liquid carryover". If liquid hydrocarbons get into the activated carbon filter, this results in blockage of the adsorption pore volume and hence in a reduction of the adsorption capacity of the fuel vapor filter.

DE 20 2008 001 586 U1, for example, has therefore disclosed the practice of providing a droplet separator in a vent line of the fuel tank, said droplet separator communicating with the filler pipe, with the result that the liquid carryover which is separated out or liquid which is formed can be fed back into the fuel tank. In the droplet separator in accordance with DE 20 2008 001 586 U1, this is achieved by virtue of the fact that the droplet separator housing is connected to the filler pipe in the region of the filling head of the latter, and the condensation space of the droplet separator communicates with the refueling duct enclosing by the filler neck.

To achieve as high a level of separation as possible, the droplet separator housing surrounding the condensation space is of labyrinth-type design in order to allow condensation and precipitation of liquid hydrocarbon particles on the labyrinth walls. On the one hand, this arrangement is relatively complicated and, on the other hand, it generates relatively high flow resistances in the venting system. Because of the relatively narrow flow cross sections, the flow velocity is also increased in an undesirable way at certain points.

It is therefore the underlying object of the invention to improve a fuel tank of the type at the outset with a view to keeping liquid hydrocarbons out of the venting flow in a manner which is as simple in design and as effective as possible.

The object is achieved by a fuel tank with at least one filler pipe enclosing a is refueling duct and with at least one vent line, which comprises at least one first and one second line section, the first line section extending from a vent connection of the fuel tank to a connection on the filler pipe, and the second line section extending from a connection on the filler pipe to a fuel vapor filter, the fuel tank according to the invention being distinguished by the fact that at least one line section opens directly into the filler pipe via a connection fitting.

According to the invention, it is envisaged that the filler pipe itself or the refueling duct enclosed by the filler pipe be used as the condensation space.

In particular, by virtue of the fact that, according to the invention, separate deposition surfaces or a separate labyrinth system are dispensed with, it is advantageously possible for virtually any quantities of fuel to emerge from the venting system, owing to the driving dynamics, without liquid hydrocarbons reaching the fuel vapor filter. There is no need for an additional droplet separator with an additional condensation space in accordance with DE 20 2008 001 586 U1; on the contrary, the filler pipe or refueling duct of the filler pipe assumes the function of a debubbling container.

In a particularly expedient embodiment of the fuel tank according to the invention, the connection fitting is designed as a dip tube that enters the filler pipe. In such a variant of the fuel tank, it has surprisingly been found that additional deposition walls as droplet separators are not required. Effective droplet separation is already achieved through the appropriate introduction of the fuel vapor volume flow into the filler pipe.

In an advantageous variant of the fuel tank of the invention, provision is made for the connection fitting to pass completely through a connection housing and to project from the latter into the filler pipe. A further connection fitting in the form, for example, of a nipple for the second line section can be provided on this connection housing, for example. The corresponding guidance and deflection of the fuel vapor volume flow by the filler pipe already brings about very effective droplet separation. Here, the slowing down of the flow velocity of the fuel vapor is volume flow when it enters the filler pipe is advantageous, in particular, since the flow duct formed by the filler pipe there undergoes an abrupt enlargement of cross section.

In an expedient embodiment of the fuel tank according to the invention, provision is made for the connection fitting to open directly into the refueling duct.

In a particularly simple and advantageous variant of the invention, the first and the second line section each open directly into the filler pipe via a connection fitting. The two connection fittings can, for example, each be arranged at different points of the filler pipe in relation to the circumference and/or in relation to the length of the filler pipe. They can, for example, be arranged diametrically opposite on the filler pipe. In the simplest case, nipples welded to the filler pipe can be provided as connection fittings. It is possible to dispense completely with a connection housing, this having the additional advantage that the connection to the filler pipe takes up relatively little installation space. It is also possible to effect such a connection at a particularly low cost.

One variant of the fuel tank according to the invention is distinguished by an insert in the filler pipe, which insert defines at least one flow duct that runs around within the filler pipe in relation to the circumference of the filler pipe and is in each case connected at the end to a connection fitting. In the simplest case, an annular space between an insert, which has to be provided in any case, and the filler pipe can be used as a flow duct, for example. Such an insert accommodates means for grounding the filler duct and the customary means for preventing incorrect fueling of the motor vehicle, for example. The "lead-free flap" may be mentioned here, for example. Moreover, means for preventing the passage of a flame or a flashover into the filler pipe are provided on such an insert, if appropriate.

It is expedient if the flow duct is formed by the annular space between the insert enclosing the refueling duct and the filler pipe.

The insert can be sealed off with respect to the filler pipe, by means of at least one sealing element extending in the longitudinal direction of the filler pipe, such is that a short circuit between the connection fittings is prevented. A sealing rib or a sealing lip can be provided on the insert as a sealing means, for example, extending in the longitudinal direction of the insert and resting in a sealing manner against the filler pipe.

The invention is explained below by means of two illustrative embodiments shown in the drawing.

In the drawing:

FIG. 1 shows a schematic view of a fuel tank according to the invention,

FIG. 2 shows a section through the filler pipe of the fuel tank along the lines II-II in FIG. 1, FIG. 3 shows a sectional view, corresponding to that in FIG. 2, of an alternative embodiment of the fuel tank according to the invention, FIG. 4 shows a view in the direction of arrow IV in FIG. 3, FIGS. 5 and 6 show a corresponding sectional view through the filling head of the filler pipe, illustrating a variant of the invention in accordance with FIG. 2 with an additional rollover valve.

FIG. 7 shows a further modification of the connection of the vent line to the filler pipe.

Reference is made first of all to FIG. 1. This shows in a greatly simplified form a fuel tank 1 with a filler pipe 2 connected to the latter underneath the vehicle. The fuel tank 1 described is constructed in one piece from a thermoplastic and is integrally connected to the filler pipe 2. It may be mentioned at this point that the filler pipe 2 could, of course, also have been connected to the fuel tank 1 by is means of a plug-in connection with a threaded union-type fastening. By way of example, the fuel tank 1 can be designed as a multi-layer extrusion blow molded plastic fuel tank, the wall of which includes barrier layers for hydrocarbons. However, the invention is not restricted to such an embodiment.

At its end remote from the fuel tank 1, the filler pipe 2 of the fuel tank is provided with a filling head 3, in the region of which the filler pipe 3 has an enlarged diameter and is provided with a funnel-shaped insert 4 (FIG. 3) to receive and guide a dispensing valve 5 in the form of a fuel pump nozzle or the like.

As already mentioned at the outset, a pivotably mounted closure flap and the customary means for preventing incorrect fueling can be provided on the insert 4.

Both when refueling and during the operation of the fuel tank 1, venting of the latter is provided via a vent line 6, which can also be of multi-part design, depending on the geometry of the fuel tank and on the venting concept. The vent line 6 comprises a first line section 6a and a second line section 6b, the first line section 6a extending from a vent connection 7 of the fuel tank 1 to the first connection fitting 8a, which is illustrated in FIG. 2 and is provided on the filling head 3 of the filler pipe 2 in the region of a connection point 9. A second connection fitting 8b is provided there, and from this a second line section 6b of the vent line 6 is routed to a fuel vapor filter 10, which can be designed as a multi-stage activated carbon filter, for example.

In the illustrative embodiment described, the vent line 6 is designed as a common vent line for both in-service venting of the fuel tank 1 and also for venting the fuel tank 1 during refueling. Venting of the fuel tank 1 during the operation of the motor vehicle is made necessary especially by the formation of gas caused by dynamic processes involved in driving and by changes in temperature. It is necessary to vent the fuel tank 1 during the refueling of the motor vehicle in order to be able to remove the gas volume flow displaced from the fuel tank 1 during refueling by the fuel that is being introduced.

Depending on whether the system described is a European or an American system, the gas volume flow which arises during refueling is passed either completely or partially, i.e. with the exception of a recirculated gas volume flow, via the fuel vapor filter 10 (American system) or is sucked off at the dispensing valve 5. The arrangement according to the invention is not restricted to either one variant or the other.

In the illustrative embodiment shown, the vent line 6 is connected as a common vent line to a vent connection 7 of the fuel tank 1, the in-service venting volume flow being passed via the in-service vent valves 11 and the refuel venting volume flow being passed via the refuel vent valve 12. The latter is additionally provided with a rollover valve. To ensure protection against overfilling, the in-service vent valves 11 are designed as pressure holding valves; as an alternative, they can be separately switchable in the sense that they are closed during the refueling operation.

In the variant, illustrated in FIG. 2, of part of the fuel tank according to the invention, the first line section 6a of the vent line 6 is connected directly to the filler pipe 2 via the first connection fitting 8a, which is designed as a dip pipe projecting into the filler pipe 2. The first connection fitting 8a can be designed in a known manner as a connection nipple with a fir tree profile as a plug-in socket for the vent line 6. The first connection fitting 8a passes through a connection housing 13, which, like the connection fitting 8a, has a circular cross section. The connection fitting 8a passes through the connection housing 13 approximately centrally and is aligned coaxially therewith. Formed radially on the connection housing 13 is a second connection fitting 8b, which receives the second line section 6b of the vent line 6. The second connection fitting 8b can also be provided as a simple nipple with a fir tree wring-fit profile.

As is readily apparent from FIG. 2, the volume of the filler pipe itself serves as a to debubbling container in the case of this connection of the first line section 6a to the filler pipe 2. The gas volume flow is passed directly into the filler pipe 2 and, when the filling head 3 is closed by the customary tank cap, is passed to the fuel vapor filter 10 via the second connection fitting 8b and the second line section 6b. On the one hand, the flow is slowed down in the filler pipe 2 owing to the increase is in cross section and, on the other hand, the entire outer wall 14 of the first connection fitting 8a forms a droplet separator or condensation surface for liquid hydrocarbons. The fuel vapor volume flow is deflected several times.

FIGS. 5 to 7 show similar variants of the connection of the vent line 6 to the filler pipe, all these variants additionally having a rollover valve 15 within the connection housing 13.

FIGS. 5 and 6 illustrate the operation of the rollover valve 15, the float 16 of which is illustrated in the position in which it opens the connection fitting 8b and thus the second line section 6b in FIG. 5, whereas the arrangement is rotated through 180° in FIG. 6, with the result that, owing to gravity, the float 16 closes the second line section 6b and the connection fitting 8b.

The variant shown in FIGS. 5 and 6, on the one hand, and the variant shown in FIG. 7, on the other hand, differ in that the second connection fitting 8b is aligned radially in relation to the cross section of the filler pipe 2, whereas, in the variant of the connection point 9 on the filler pipe 2 shown in FIG. 7, the connection fitting 8b is aligned tangentially in relation to the cross section of the filler pipe 2 and aligned radially in relation to the connection housing 13.

In the text which follows, reference will now be made to FIGS. 3 and 4, which show a second illustrative embodiment of the configuration of the fuel tank according to the invention in the region of the connection point 9.

In this variant, both the first line section 6a and the second line section 6b are connected via a respective connection fitting 8a, 8b to the filler pipe 2 in such a way that both connection fittings 8a, 8b open directly into the filler pipe 2, more specifically at a distance from one another in relation to the circumference of the to filler pipe 2. No connection housing in the sense of the first illustrative embodiment is provided.

The connection fittings 8a, 8b are provided in the region of the insert 4 provided in the filler pipe 2, an annular space 17, which defines an extended venting path or an encircling flow duct, being formed between the insert 4 and the filler pipe 2. To ensure that the fuel vapor volume flow travels the longest possible flow path, a dividing web 18 extending in the longitudinal direction of the filler pipe 2 and of the insert 4 is provided as a sealing element on the circumference of the insert 4, between the connection fittings 8a, 8b, for instance. This dividing web 18 prevents short-circuiting of the fuel vapor volume flow between the connection fittings 8a, 8b.

LIST OF REFERENCE SIGNS 1 fuel tank
2 filler pipe
3 filling head
4 insert
5 dispensing valve
6 vent line
6a first line section
6b second line section
7 vent connection
8a first connection fitting
8b second connection fitting
9 connection point on the filler pipe
10 fuel vapor filter
11 in-service vent valves
12 refuel vent valve
13 connection housing
14 outer surface of the connection fitting
15 rollover valve
16 float
17 annular space
18 dividing web

What is claimed is:

1. Fuel tank with at least one filler pipe enclosing a refueling duct and with at least one vent line, which comprises at least one first and one second line section, the first line section extending from a vent connection of the fuel tank to a connection on the filler pipe, and the second line section extending from a connection on the filler pipe to a fuel vapor filter, wherein at least one of the first and second line sections open directly into the filler pipe via at least one connection fitting such that a flow of fuel vapor in at least one of the first and second line sections will flow directly into the filler pipe via the at least one connection fitting without first flowing through an added droplet separator, and wherein the at least one vent line is open to provide venting during a refueling and an operation of the fuel tank; and wherein the at least one vent line and the filler pipe are arranged to provide an increase in a cross-sectional area such that liquid droplets within the fuel vapor separate and flow back to the fuel tank.

2. Fuel tank according to claim 1, wherein the connection fitting is designed as a dip tube that enters the filler pipe.

3. Fuel tank according to claim 1 wherein connection fitting passes through a connection housing and projects from the latter into the filler pipe.

4. Fuel tank according to claim 1, wherein the connection fitting opens directly into the refueling duct.

5. Fuel tank according to claim 1, wherein the at least one connection fitting comprises a first connection fitting and a second connection fitting; and wherein the first line section opens directly into the filler pipe via the first connection fitting and the second line section opens directly into the filler pipe.

6. Fuel tank according to claim 5, wherein the first and the second connection fittings are each arranged at different points of the filler pipe in relation to the circumference and/or in relation to the length of the filler pipe.

7. Fuel tank according to claim 5, further including an insert in the filler pipe, which insert defines at least one flow duct that runs around within the filler pipe in relation to the circumference of the filler pipe and is connected at a first end to the first connection fitting and is connected at a second end to the second connection fitting.

8. Fuel tank according to claim 7, wherein the flow duct is formed by an annular space between the insert enclosing the refueling duct and the filler pipe.

9. Fuel tank according to claim 6, wherein the insert is sealed off in such a way with respect to the filler pipe, by means of at least one sealing element extending in the longitudinal direction of the filler pipe, that a short circuit between the first and second connection fittings is prevented.

* * * * *